United States Patent [19]
Johnson

[11] Patent Number: 4,624,444
[45] Date of Patent: Nov. 25, 1986

[54] CONTROL STOP FOR FLUSHING SYSTEM
[75] Inventor: Dwight N. Johnson, Carlsbad, Calif.
[73] Assignee: Masco Corporation, Taylor, Mich.
[21] Appl. No.: 791,771
[22] Filed: Oct. 28, 1985
[51] Int. Cl.[4] .................. F16K 47/04; F16K 51/00
[52] U.S. Cl. .................................. 251/121; 137/509; 137/495; 138/46; 251/205; 251/285
[58] Field of Search ................ 138/43, 45, 46; 251/118, 120, 121, 122, 205, 285, 44; 137/509, 510, 495

[56]        References Cited
    U.S. PATENT DOCUMENTS

| 2,204,191 | 6/1940 | Sloan et al. | 251/120 |
| 2,872,150 | 2/1959 | Philippe | 251/44 |
| 3,054,422 | 9/1962 | Napolitano | 137/509 |
| 3,139,114 | 6/1964 | Benzel | 138/45 |
| 3,512,550 | 5/1970 | Ammann | 251/122 |
| 3,613,716 | 10/1971 | Kornwestheim et al. | 251/44 |
| 3,857,542 | 12/1974 | Heymann | 251/120 |

FOREIGN PATENT DOCUMENTS 19085 10/1956 Fed. Rep. of Germany ...... 137/509

Primary Examiner—George L. Walton
Attorney, Agent, or Firm—Mason, Kolehmainen, Rathburn & Wyss

[57] ABSTRACT

A control stop for a flushing system including a metering flush valve connected to supply liquid to a toilet fixture. The control stop is in series flow relation between a source of pressurized liquid and the metering flush valve and serves the several functions of controlling flow to the metering flush valve for reducing noise and maintaining desired flushing action, preventing reverse flow and trapping pressure at the metering flush valve in the event of loss of inlet pressure, and shutting off the flow path for installation, service or replacement of the metering flush valve. The control stop includes a regulator having a valving portion engageable with a valve seat communicating with the outlet of the control stop and acts as a low pressure cut-off rather than a check valve. A spring biases the regulator toward the valve seat and the regulator is normally held open by liquid pressure. A stop member is adjustable to limit the opening movement of the regulator for flow control, and can be moved to a position closing the regulator valving surface against the valve seat to shut off the liquid flow path.

8 Claims, 4 Drawing Figures

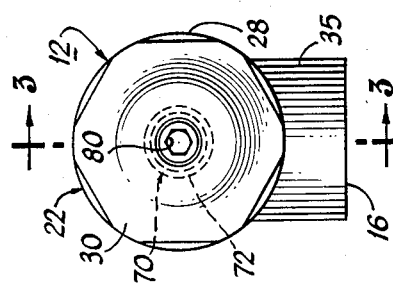
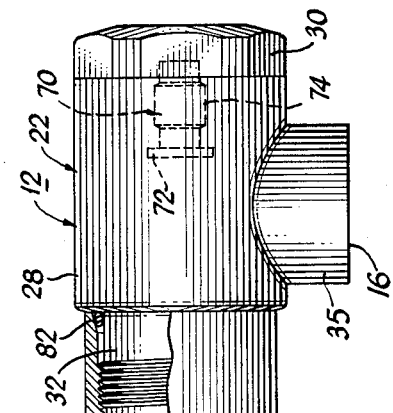
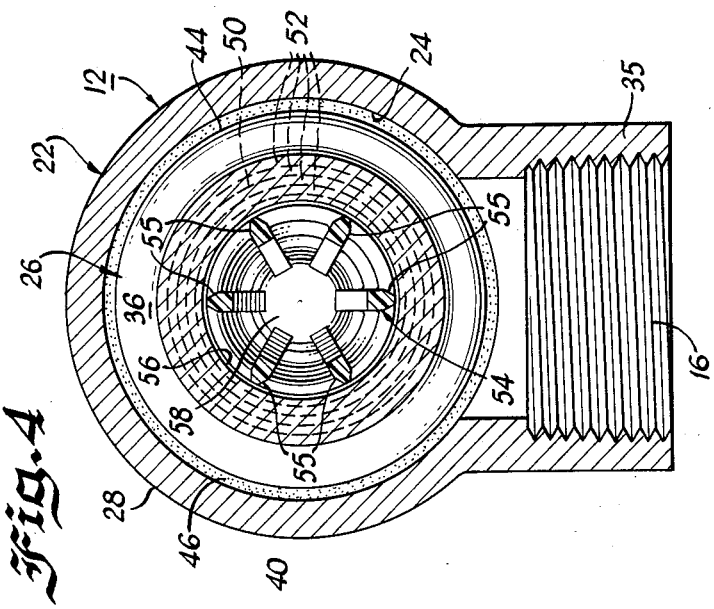
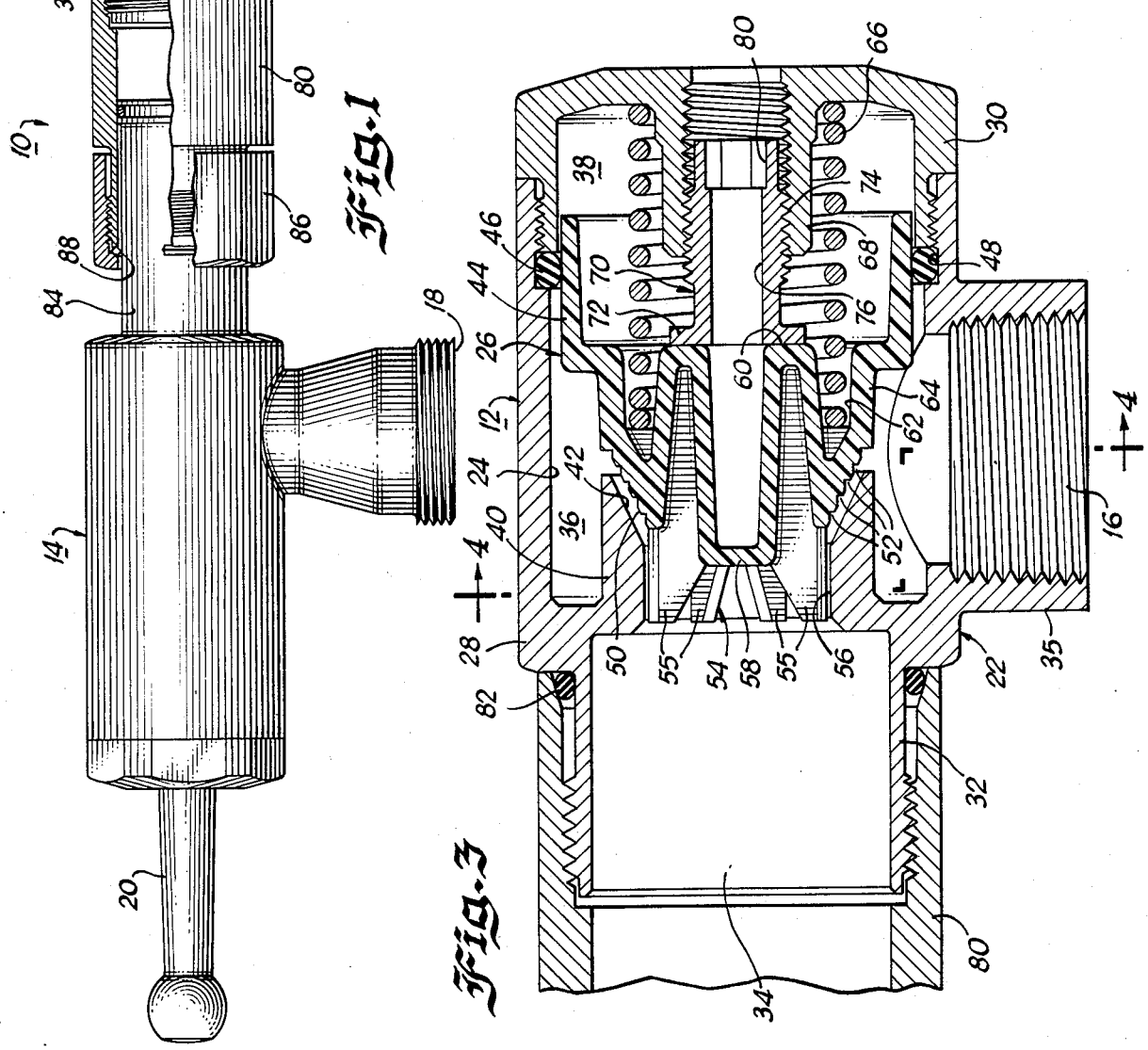

CONTROL STOP FOR FLUSHING SYSTEM

The present invention relates to control stops and more particularly to improvements in control stops for toilet fixture flushing systems.

A toilet fixture flushing system widely used in large commercial structures includes a metering flush valve (sometimes called a "Flushometer" valve) for providing a predetermined metered flow of liquid to a toilet fixture in each cycle of operation. A control stop is typically interposed in the flow path between a source of pressurized liquid and the inlet of the metering flush valve. One function performed by the control stop is to provide a flow restriction preventing undesired high liquid flow rates at elevated inlet pressures thereby to avoid noise and improper flushing action. Another function performed by the control stop is to prevent reverse flow in the event of supply pressure loss so that the metering flush valve is maintained in its closed position. A third function performed by the control stop is to serve as a shut-off valve to interrupt the liquid supply path to the metering flush valve so that the metering flush valve may be repaired or replaced.

One typical control stop of the type widely used in conventional flushing systems is disclosed in U.S. Pat. No. 3,556,137. This device functions as a check valve with a valve plug biased by a spring toward a valve seat located at the control stop inlet. This arrangement uses a relatively light spring providing a low forward cracking pressure. This check valve operation has a number of disadvantages. One disadvantage is that the metering flush valve supplied by the control stop can be supplied with liquid at undesirably low supply pressures resulting in undesirable erratic operation. Another disadvantage is that the relatively light spring fails to insure tight closure in the event of supply pressure loss. Yet another disadvantage of the check valve mode of operation is that the control stop inherently exhibits a forward pressure loss in operation.

Among the important objects of the present invention are to provide an improved control stop for flushing systems of the type using a metering flush valve; to provide a control stop functioning as a low pressure cut-off rather than as a check valve in order to avoid forward cracking pressure loss and to assure tight closure in the event of supply pressure loss; to provide a control stop capable of trapping pressurized liquid between the control stop and a metering flush valve upon loss of or decrease in supply pressure and capable of abruptly reopening in response to resumption of supply pressure; to provide a control stop resistant to vandalism or tampering; to provide a control stop having a minimum number of parts and providing economies in manufacture and assembly; and to provide a control stop overcoming the disadvantages of devices of this type used in the past.

In brief, in accordance with the above and other objects of the present invention, there is provided a control stop for a flushing system including a source of pressurized liquid and a metering flush valve connected to supply liquid to a toilet fixture. The control stop is in series liquid flow relation between the liquid source and the metering flush valve and includes a housing having a cavity in which a regulator is movably mounted in sealed relation to define a control region in the cavity. An inlet port continuously communicates with the control region and an outlet port connected to the metering flush valve continuously communicates with a valve seat in the cavity. The regulator includes a valving portion engageable with the valve seat, and spring means biases the regulator toward the valve seat in opposition to liquid pressure in the control region. The opposite side of the regulator is vented to atmosphere so that inlet pressure existing in the control region normally moves the regulator to an open position in which flow is permitted through the valve seat. A stop member is adjustable to define the open position of the regulator for throttling flow at elevated pressures, and is adjustable toward the valve seat to perform a shutoff function.

The invention together with the above and other objects and advantages may be best understood from the following detailed description of the preferred embodiment of the invention illustrated in the drawing, wherein:

FIG. 1 is a side elevational view of a flushing system for a toilet fixture including a control stop and a metering flush valve;

FIG. 2 is an end view of the control stop of the flushing system of FIG. 1;

FIG. 3 is an enlarged sectional view of the control stop taken along the line 3—3 of FIG. 2; and FIG. 4 is a sectional view of the control stop taken along the line 4—4 of FIG. 3.

Having reference now to the drawing, and initially to FIG. 1, there is illustrated a flushing system designated as a whole by the reference character 10 including a control stop generally designated as 12 and a metering flush valve generally designated as 14. The control stop 12 and the flushing system 10 are constructed in accordance with principles of the present invention.

In general, the flushing system 10 is supplied with liquid from a source of pressurized liquid communicating with an inlet port 16 of the control stop 12. In a typical installation of the flushing system, liquid is supplied to inlet port 16 by the relatively high capacity plumbing system of a large commercial structure such as an office building, factory, hotel, stadium, hospital, or the like. A plumbing fixture such as a urinal or water closet (not shown) is connected to an outlet port 18 of the metering flush valve 14. When an actuator 20 of the metering flush valve 14 is operated, the metering flush valve in combination with the control stop 12 functions to execute a cycle of operation in which a metered quantity of liquid is admitted from the source to the plumbing fixture.

Control stop 12 may be used with a variety of different types of metering flush valves. The metering flush valve 14 illustrated in the drawing is described in detail in my copending U.S. Pat. application filed on the same day as the present U.S. application, Ser. No. 791,772. That copending application is incorporated herein by reference and may be consulted for a description of the structure and operation of the metering flush valve beyond that required for an understanding of the present invention. It should be understood that principles of the present invention are applicable also to flushing systems using other types of metering flush valves such as that shown in U.S. Pat. No. 3,556,137.

In the flushing system 10 shown in the drawing and in other flushing systems in which the control stop 12 may be employed, the control stop during normal operation functions to throttle or choke the flow of liquid through the flushing system to the end that the metering flush valve such as the valve 14 reliably and consistently carries out a cycle of operation during each actuation. Water systems of commercial structures may provide liquid with supply pressures varying in different installations between, for example, 20 to 80 pounds per square inch. When elevated supply pressures are encountered, the control stop 12 is used to limit flow to the metering flush valve so that similar flushing operation is achieved independent of supply pressure variations.

Metering flush valves such as the illustrated metering flush valve 14 are maintained normally in a closed condition by the effect of inlet pressure. Another function of the control stop 12 is to trap inlet pressure at the inlet of the metering flush valve to maintain the metering flush valve in its closed condition in the event of loss of supply pressure. In accordance with one feature of the present invention, control stop 12 positively and reliably prevents all flow to the metering flush valve 14 if supply pressure decreases below the pressure required for reliable and consistent flushing operation. Moreover, when supply pressure increases, control stop 12 abruptly reopens without forward cracking pressure loss.

Another function performed by control stop 12 is to perform as a shut-off valve to permit servicing of the metering flush valve of the flushing system 10. In accordance with a feature of the invention, the manual adjustment structure of the control stop 12 permitting manual shut-off and manual adjustment of the throttling of flow is resistant to tampering and vandalism.

Proceeding now to a more detailed description of the control stop 12, the control stop includes a housing 22 defining an internal cavity 24 in which a regulator 26 is movable in an axial direction. Housing 22 includes a body 28 receiving at one end a threaded cap 30. An axially directed externally threaded conduit 32 of body 28 defines an outlet port 34 of the control stop. An internally threaded tubular fitting portion 35 of body 28 defines the inlet port 16.

Regulator 26 divides the cavity 24 into a control region 36 and a vented spring chamber 38. Body 28 includes a tubular projection or flange 40 extending into the control region 36 and defining a valve seat 42 interposed between the control region 36 and the outlet port 34. Inlet port 16 is in continuous and unimpeded communication with the control region 36 so that region 36 is continuously subjected to supply pressure when inlet port 16 is connected to a source of pressurized liquid.

Regulator 26 is a piston-like element including an annular skirt portion 44 having an outside diameter slightly smaller than the inside diameter of the cavity 24 defined by the body 28 and cap 30. A single 0-ring seal 46 isolates the control region 36 from the chamber 38 and also prevents leakage from housing 22. Seal 46 is captured in a groove 48 defined between the body 28 and the cap 30 when they are assembled and is in sliding and sealing engagement between the housing 22 and the annular skirt portion 44 of the regulator 26.

A valving portion 50 of regulator 26 cooperates with the valve seat 42 to throttle or alternatively prevent flow between the control region 36 and outlet port 34. Portion 50 and seat 42 include generally parallel conical surfaces disposed at an acute angle to the axis of the control stop 12. This permits a fine throttling flow adjustment because a given degree of axial movement of the regulator 26 results in a relatively slight change in the separation of the portion 50 and seat 42.

The acute angular arrangement of the portion 50 and seat 42 permits throttling of flow through the control stop 12 over a relatively long restricted flow path. Valving portion 50 is provided with a sequence of numerous throttling restrictions created by separated annular grooves or recesses 52 in the valving portion 50. These sequential annular flow restrictions in series flow relationship with one another limit the noise caused by flow through the control stop by distributing the flow restriction over numerous different locations.

Axial movement of the regulator 26 is guided by engagement of the skirt portion 44 with the seal 46 and also by loose sliding engagement of a guide structure 54 of regulator 26 within an annular bore 56 defined in projection 40 of body 28 between the valve seat 42 and the outlet port 34. Guiding structure 54 includes a number of ribs 55 extending radially from a central hub portion 58 of the regulator 26 and terminating at beveled, narrow edges lying in a circular cylindrical plane slightly smaller than the diameter of the bore 56. This guiding structure 54 accurately positions the regulator 26 in the housing 22 without impeding or disturbing flow from the valve seat 42 to the outlet port 34.

Between the central hub portion 58 and the valving portion 50, the regulator 26 includes an annular abutment portion 60 directed away from the outlet port 34 and toward the cap 30. A spring retaining recess 62 is defined around the annular abutment portion 60 and within a radially offset wall 64 extending between the valving portion 50 and the annular skirt portion 44.

A spring 66 is captured in compression between the cap 30 and the regulator 26. One end of the spring 66 is received in the spring retaining recess 62, while the other end surrounds a hub portion 68 of cap 30. Spring 66 continuously biases the regulator 26 toward the valve seat 42 and, in the absence of pressure in control region 36, holds the valving portion 50 firmly in sealed engagement with the valve seat 42. In comparison with conventional control stops having a spring force of, for example, less than one pound, the spring 66 provides a very substantial closing force of, for example, about 15 pounds. As a result, if supply pressure is lost, the control stop is very firmly held in the closed position to prevent any leakage of liquid in either direction through the flushing system 10.

The full open position of the valving portion 50 of regulator 26 relative to the valve seat 42 of body 28 is defined by an adjustable stop member 70. Member 70 includes a stop portion 72 engageable by the abutment portion 60 of regulator 26 as illustrated in FIG. 3. An externally threaded portion 74 of stop member 70 is engageable with internal threads formed in hub 68 of cap 30 so that rotation of stop member 70 results in axial movement of the stop portion 72. A central opening 76 extends through the full length of stop member 70 for venting of chamber 38 to atmosphere. If desired, venting may also be accomplished by thread clearance between the threaded portion 74 and the hub portion 68.

The outermost end of opening 76 is enlarged and shaped to provide a recess 78 shaped to accept a tool for rotating stop member 70. In the illustrated arrangement, the enlarged recess 78 is hex-shaped to mate with an Allen wrench. The length of the adjustable stop member 70 is such that it is always recessed within hub portion 68 and is inaccessible and not apparent to vandals. Moreover, when the control region 36 is subjected to inlet pressure, the abutment portion 60 is urged firmly against the stop portion 72 so that the stop member 70 is held firmly in position
and is difficult to turn without the proper tool. Since tampering and vandalism are discouraged by this structure, the threaded bore in the cap 30 and the stop member 70 need not be covered. If desired, a decorative insert (not shown) may be placed in the bore.

In operation of the flushing system 10 and control stop 12, inlet pressure is continuously admitted to control region 36. If pressure supplied from the source such as a water system of a commercial structure exceeds a predetermined magnitude such as 20 pounds per square inch, the stop member 70 is adjusted to throttle flow through the valve seat 42 to achieve reliable and consistent operation of the metering flush valve 14.

Supply pressure in the control region 36 opposes the force of spring 66 and normally holds the regulator 26 in its full open position with abutment 60 tightly against stop portion 72. When the metering flush valve 14 is actuated, the flow restriction provided between the valving portion 50 and the valve seat 42 throttles flow to the metering flush valve for proper operation while the numerous grooves or recesses 52 provide distributed flow restriction for quiet operation.

In the event of loss of supply pressure, the force of spring 66 moves the regulator 26 to the closed position and provides a tight seal preventing flow through the control stop 12. This traps supply pressure at the outlet port 34 so that the trapped supply pressure continues to hold the metering flush valve 14 in its closed condition. If the metering flush valve 14 is actuated while the control stop 12 is closed due to reduced supply pressure, pressure at the outlet port 34 drops and the regulator 26 is held even more firmly in its closed position.

When supply pressure rises once again to the normal operating level, pressure also increases in the control region 36. That portion of the regulator 26 radially outside of the valve seat 42 is subjected to the elevated pressure. When this pressure reaches or exceeds a predetermined level, such as 15 pounds per square inch, the regulator 26 moves away from the closed position. This admits increased pressure to the outlet port 34 and metering flush valve 14 so that once the control stop begins to open, its entire cross-sectional area within the skirt portion 44 is subjected to supply pressure. As a result, once the control stop begins to reopen, it abrubtly moves to the full open position so that disadvantages associated with uncertain movement to intermediate positions are avoided. Since the regulator member is not partly opened at low supply pressures, consistent and reliable operation of the metering flush valve 14 is assured.

In the event that servicing such as repair or replacement of the metering flush valve is required, the stop member 70 is moved toward the valve seat 42 until the valving portion 50 closes against the valve seat. Further flow through the control stop 12 is prevented and the metering flush valve 14 may be removed without flow through the flushing system 10.

In the flushing system 10 illustrated in FIG. 1, the outlet port 34 of the control stop 12 communicates with the metering flush valve 14 through an extension fitting 80 engaging the outlet fitting 32. A seal 82 prevents leakage between the extension fitting and the body 28. An inlet conduit 84 extending from the metering flush valve 14 is received within the extension fitting 80. A cap member 86 is threaded onto the outer end of the extension fitting 80 and a locking ring 88 is compressed between these parts to lock against the outer surface of the conduit 84.

This arrangement provides for flexibility in spacing between the metering flush valve 14 and the control stop 12. Extension fittings 80 of different lengths may be provided for different installations. Moreover, if it is desired to mount the control stop 12 closer to the metering flush valve 14, the extension fitting 80 may be eliminated and the conduit 84 may directly enter the outlet port 34 of the control stop 12. In this installation, the cap member 86 and the locking ring 88 are mounted directly over the outlet fitting 32 of the body 28.

While the present invention has been described with reference to details of the illustrated embodiment, such details are not intended to limit the invention as defined in the following claims.

What is claimed and desired to be secured by Letters Patent of the United States is:

1. A flushing system for a toilet fixture comprising:
   a metering flush valve connected to supply liquid to the toilet fixture;
   a control stop in series liquid flow relation between a source of pressurized liquid and said metering flush valve;
   said control stop including a housing including a body and a cap and having a cavity defined between the body and cap;
   a regulator movably mounted in sealed relation in said cavity and defining a control region in said cavity;
   an inlet port in said housing in continuous communication with said control region and connected to the source of pressurized liquid;
   an outlet port in said housing connected to the metering flush valve;
   a valve seat in said cavity in communication with said outlet port;
   said regulator including a skirt portion and a valving portion engagable with said valve seat;
   a spring disposed at least partly within said skirt portion and being in compression between said cap and said regulator biasing said regulator toward said valve seat in opposition to liquid pressure in said control region;
   means venting to atmosphere the side of said regulator opposite said control region;
   a stop member having at least a portion always enclosed with said skirt portion and spaced from said valve seat and engagable by said regulator when said regulator moes away from said valve seat; and
   manually operable adjustment means movable independently of said spring for positioning said stop member in a shut-off position in which said regulator valving portion engages said valve seat and alternatively positioning said stop member in one of a range of throttling flow positions in which said valving surface is movable a selected distance from said valve seat.

2. A flushing system as claimed in claim 1, said adjustment means including a threaded member mounted in said cap and said stop member being formed on said threaded member.

3. A flushing system as claimed in claim 2, said spring surrounding said threaded member.

4. A flushing system as claimed in claim 2, said venting means including a vent passage defined at least in part by said threaded member and extending through said cap.

5. A flushing system as claimed in claim 1, said valve seat and said regulator valving portion including substantially parallel conical valve surfaces disposed at an acute angle to the direction of axial flow through said valve seat.

6. A flushing system as claimed in claim 5, one of said valve surfaces including a series of projecting ridges defining numerous throttling areas in series flow relation with one another between said valve surfaces.

7. A flushing system as claimed in claim 1, said outlet port being axially aligned with said valve seat, and said regulator including a projecting guide portion slidably received within said valve seat for guiding the movement of said regulator.

8. A flushing system for a toilet fixture comprising:
a metering flush valve connected to supply liquid to the toilet fixture;
a control stop in series liquid flow relation between a source of pressurized liquid and said metering flush valve;
said control stop including a housing inluding a body and cap and having a cavity defined between the body and cap;
a regulator including a circumferential portion movably mounted in sealed relation with said housing and defining a control region in said cavity;
an inlet port in said housing in continuous communication with said control region and connected to the source of pressurized liquid;
an outlet port in said housing connected to the metering flush valve;
a valve seat in said cavity in communication with said outlet port;
said regulator including a valving portion engagable with said valve seat;
spring means biasing said regulator toward said valve seat in opposition to liquid pressure in said control region;
means venting to atmosphere the side of said regulator opposite said control region;
a stop member spaced from said valve seat and engagable by said regulator when said regulator moves away from said valve seat;
manually operable adjustment means for positioning said stop member in a shut-off position in which said regulator valving portion engages said valve seat and alternatively positioning said stop member in one of a range of throttling flow positions in which said valving surface is movable a selected distance from said valve seat; and
a single annular O-ring seal member captured in sealing relation between said body and cap, said annular seal member also being slidably and sealingly engaged by said regulator through the range of movement of said regulator.

* * * * *